United States Patent

[11] 3,629,997

[72] Inventor Charles William DeMuth
    Unadilla, N.Y.
[21] Appl. No. 35,847
[22] Filed May 8, 1970
[45] Patented Dec. 28, 1971
[73] Assignee Borden Inc.
    New York, N.Y.

[54] PROCESS FOR PRODUCING METHANOL-FORMALDEHYDE SOLUTION OF LOW-WATER CONTENT
    14 Claims, 1 Drawing Fig.
[52] U.S. Cl. .................................................... 55/89,
    55/93, 159/47, 203/17
[51] Int. Cl. ............................................... B01d 47/00
[50] Field of Search ............................................ 55/25, 27,
    56, 89, 93; 159/16, 47; 203/17, 18, 42

[56] References Cited
    UNITED STATES PATENTS
2,527,655  10/1950  Pyle et al. .................... 203/17
2,676,143   4/1954  Lee et al. .................... 203/17
3,214,891  11/1965  Kloepper et al. ............. 55/56
3,243,939   4/1966  De Rooij ....................... 55/89
3,289,391  12/1966  De Rooij et al. .............. 55/89
3,493,472   2/1970  Schumacher ................ 203/17 X Primary Examiner—Reuben Friedman
Assistant Examiner—R. W. Burks
Attorneys—George P. Maskas, Edward L. Mandell and George A. Kap ABSTRACT: A gaseous stream from a formaldehyde converter is introduced into a concentrator-absorber wherein the gaseous stream is scrubbed countercurrently with an aqueous formaldehyde solution from a water absorber of a conventional formaldehyde plant. The bottom stream withdrawn from the concentrator-absorber is recirculated to the top of the concentrator-abosrber and a portion of this stream is withdrawn and mixed with methanol to provide a methanol-formaldehyde solution of the desired concentration.

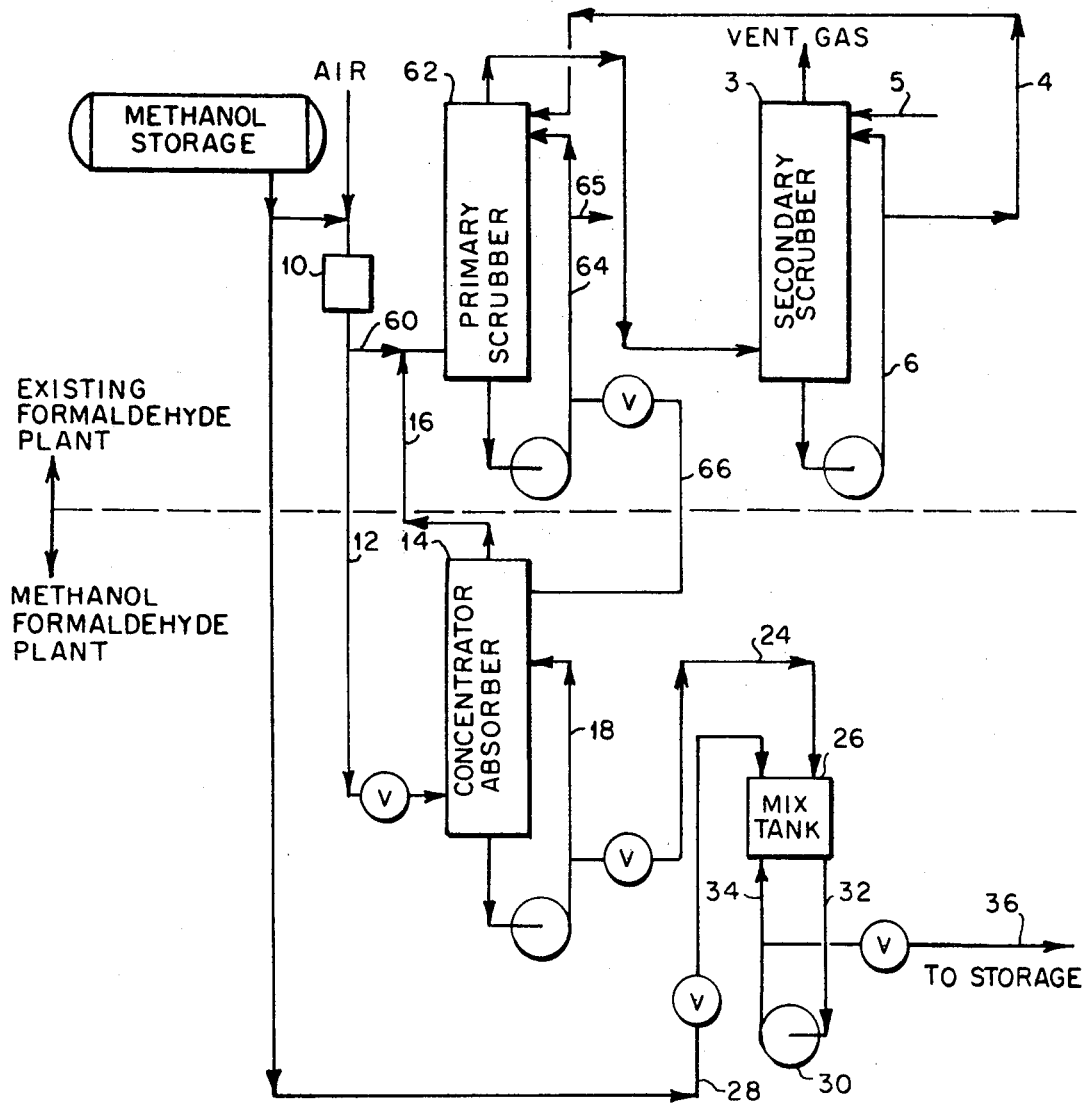
CHARLES WILLIAM DE MUTH
*INVENTOR.*

PROCESS FOR PRODUCING METHANOL-FORMALDEHYDE SOLUTION OF LOW-WATER CONTENT

This invention relates to a process for producing methanol-formaldehyde solution of a low water content.

Alkanol-formaldehyde solutions have become important in the production of specialty resins, particularly for use in protective coatings and in textile applications. Since it is important, in many instances, that such solutions have low water content, they are now ordinarily produced by dissolving paraformaldehyde product of specified composition. This method requires, first, the production of paraformaldehyde, and then, the additional step of dissolving such material in an alkanol. In another method, an aqueous formaldehyde solution, enriched with respect to formaldehyde, is prepared and then mixed with an alkanol to obtain a product of desired composition.

Kloepper et al. U.S. Pat. No. 3,214,891 describes a process for preparing alkanol-formaldehyde solutions by partially condensing a gaseous formaldehyde stream to produce a water-enriched condensate and a formaldehyde-enriched vapor; separating the condensate and the vapor; and introducing the vapor into an alkanol absorber to absorb substantially all of the formaldehyde in the alkanol. This process is cumbersome in that it requires more process steps and additional equipment.

It is an object of this invention to provide a process for producing methanol-formaldehyde solutions of a low water content without requiring the production of highly concentrated formaldehyde or paraformaldehyde.

Another object of this invention is a process for producing methanol-formaldehyde solutions of low water content by absorbing the product vapors, emanating from the formaldehyde converter, in an aqueous solution, concentrating this solution with respect to formaldehyde and adding a predetermined amount of methanol to obtain a solution of desired composition.

Another object is a process for producing methanol-formaldehyde solutions of low water content without resorting to evaporation or distillation procedures.

Briefly stated, the present invention pertains to a process for producing methanol-formaldehyde solutions of low water content. This process is characterized by the fact that gaseous effluent from the formaldehyde converter is passed through a concentrator-absorber and then blended with methanol to adjust the composition of the methanol-formaldehyde solution to the desired specification.

Gaseous effluent is obtained from conventional formaldehyde plants wherein formaldehyde is produced either by the methanol or the hydrocarbon processes. In the methanol process, a mixture of methanol vapor and air is passed over a stationary catalyst at approximately atmospheric pressure and the product gases are absorbed in water. Methanol is vaporized by either flash vaporization, which is then mixed with air under controlled conditions, or by passing air through methanol maintained at a temperature required to obtain the desired mixture. Precautions are taken to avoid explosive mixtures of methanol and air. The feed vapors, usually preheated, are passed into the converters or burners which may consist of jacketed vessels containing a shallow bed of catalyst such as silver, or copper, or iron-molybdenum oxide. Gaseous effluent is passed directly to a scrubber where the gases are cooled and the formaldehyde is absorbed by countercurrently circulating solution. The off gases, or inerts, are taken off the top of the scrubber. The product solution, which contains some methanol, must be adjusted to meet customer requirements with respect to its methanol and formaldehyde contents. Excess methanol may be removed by fractionation so that a substantially methanol-free solution can be obtained, if desired.

In the silver-or-copper catalyzed methanol process, the methanol-air vapor mixtures contain up to 50 percent by volume of methanol and the temperature in the reactor may vary between 450° and 650° C., with an optimum temperature being at about 635°C. The off gases contain 18–20 percent hydrogen and less than 1 percent oxygen. Conversions in the range of 60–73 percent have been attained, with net yields of 83–92 percent. The product solution contains unreacted methanol.

The methanol-air mixtures used in the oxide-catalyst process contain only 5–10 percent methanol. Reaction temperatures are 300°–430° C. and the yields are somewhat higher than those for the silver-catalized process.

The hydrocarbon process involves partial oxidation of a hydrocarbon gas with air or oxygen under pressure, followed by rapid cooling, condensation, and absorption of the products in water to give a crude solution which must then be refined to separate formaldehyde from the other reaction products such as methanol, acetaldehyde, propyl alcohol, propionaldehyde, and organic acids. Formaldehyde is isolated as a dilute solution, which must be concentrated to market strength. This solution is not the major product from these processes, the quantity and distribution of other products being dependent on the hydrocarbon raw material and processing technique.

The invention disclosed herein is illustrated by the attached flow diagram wherein the feed stream consists of an effluent stream leaving the converter in which the methanol-air mixture is converted to product vapors. The flow diagram illustrates the methanol-formaldehyde plant in conjunction with an aqueous-formaldehyde plant. Amount of the gaseous effluent or product vapors from the converter diverted to the alcohol-formaldehyde plant will depend on the relative requirements of the corresponding product solutions and other factors.

Referring to the attached flow diagram, the gaseous effluent stream leaving converter 10 is divided into two parts: one part is delivered to the water absorber 62 in the conventional aqueous formaldehyde plant, and the other part is introduced into the concentrator-absorber 14 of the alcohol formaldehyde facility. The gaseous effluent stream from converter 10, which uses silver catalyst and rich methanol-air mixtures, generally includes 10–35 percent formaldehyde, 5–20 percent methanol, 5–25 percent water and 40–75 percent inerts consisting mostly of nitrogen, oxygen, carbon dioxide, carbon monoxide, hydrogen and methane. The portion of the gaseous effluent designated as inerts constitute those gases which are not absorbed in the concentrator-absorber 14. In the production of many preferred solutions, a water content of less than about 10 percent in the gaseous effluent is desired.

The gaseous effluent is delivered to the concentrator-absorber by way of line 12 at a temperature of about 80° to 450° C., and preferably at a temperature of 100° to 200° C. The pressure in line 12 may vary from 10 p.s.i.a., to 20 p.s.i.a., but is preferably atmospheric.

In the conventional aqueous formaldehyde plant illustrated in the flow diagram, the gaseous effluent stream introduced into water absorber 62 by means of line 60 is passed countercurrently to a weak aqueous-formaldehyde solution which is introduced into water absorber 62 from secondary water absorber 3 through line 4. Water is introduced into the secondary water absorber 3 through line 5 and a weak aqueous-formaldehyde solution from absorber 62 is likewise recirculated to the upper portion of said absorber by way of line 64.

Any one of the several commercial types of absorbers, such as sieve tray columns, bubble cap columns and vapor-liquid contactors, in general, may be used which are effective in promoting absorption of the vapors in the circulating solution.

The gaseous effluent stream introduced into concentrator-absorber 14 is scrubbed with the concentrated formaldehyde recirculating solution in line 18 and aqueous-formaldehyde solution from water absorber 62 introduced into concentrator-absorber 14 by way of line 66. The operating pressure and temperature at the top of concentrator-absorber 14 will vary from 10 p.s.i.a. to 20 p.s.i.a. and from 75° to 125° C.; and preferably from 13 p.s.i.a. to 17 p.s.i.a. and 75° to 90° C. At the bottom of the concentrator-absorber 14, the pressure will vary between 11 and 21 p.s.i.a. while the temperature will be in the range of 85°–125° C. Recirculating solution 18 consists essentially of 60 to 75 percent formaldehyde, 15 to 25 percent methanol and 5 to 15 percent water. The preferred composition of the recirculating solution 18 is as follows: 71–73 percent formaldehyde, 17–19 percent methanol and 7–12 percent water. The temperature of recirculating stream must be maintained above about 85° C. since temperatures below about 80° C. are detrimental to the process because methanol would be flashed-off before water, as one would normally expect. At temperatures above about 85° C., water is vaporized from the recirculating solution before methanol although methanol boils at 65° C. while water, at 100° C.

The portion of the aqueous-formaldehyde recirculating solution 64 diverted from water absorber 62 to concentrator-absorber 14 through line 66 may be introduced into concentrator-absorber 14 either at the upper portion thereof or mixed with recirculating stream 18 and then introduced into the concentrator-absorber. The temperature of the aqueous formaldehyde stream 64 is in the range of 40° to 125° C. and its composition consists essentially of 30 to 50 percent formaldehyde, 15 to 30 percent methanol and 25 to 35 percent water. The composition of a typical aqueous-formaldehyde stream 64 is 46 percent formaldehyde, 23 percent methanol and 31 percent water.

The aqueous-formaldehyde recirculating stream 66 is introduced into the concentrator-absorber 14 to provide a scrubbing liquid for the gaseous effluent entering the concentrator absorber through line 12. Proportion of the aqueous-formaldehyde recirculating solution that is introduced into the concentrator-absorber to the concentrated formaldehyde recirculating solution 18 entering the concentrator-absorber is in the range of 1:20 to 1:100, and preferably in the range of 1:30 to 1:50, on weight basis. Concentrator-absorber receives the aqueous-formaldehyde solution from water absorber 62 and allows it to come in contact with the gaseous effluent from converter 10 thus concentrating the aqueous-formaldehyde solution with respect to its formaldehyde content.

A portion of the aqueous formaldehyde solution may be withdrawn from line 64 through line 65.

The unabsorbed vapors in concentrator-absorber 14, consisting essentially of inerts and a small amount of water, formaldehyde and methanol, are passed through line 16 into line 60 where they are mixed with the gaseous effluent from converter 10 and introduced into water absorber 62. The unabsorbed vapors leave concentrator-absorber at a temperature of 70° to 125° C. and a pressure of 10 p.s.i.a. to 20 p.s.i.a., and preferably at 85° to 95° C. and 13 to 17 p.s.i.a. A typical composition of the unabsorbed condensibles in the vapor stream is as follows:

$CH_2O$ —32.5%
$CH_3OH$—40.0%
$H_2O$ —27.5%

A portion of the recirculating solution 18 is withdrawn through line 24 and pumped into mix tank 26. The proportion of the recirculating solution returned to the concentrator-absorber to the recirculating solution withdrawn from the recirculating circuit is in the range of 30:1 to 50:1. Methanol is added to the mix tank in a predetermined amount through line 28. Methanol and the solution delivered through line 24 are mixed by circulating the mixture through pump 30 by way of lines 32, 34. A side stream 36 is withdrawn from mix tank 26 or from line 34 and stored as the final methanol-formaldehyde solution product.

In an embodiment which is not illustrated in the drawing, the necessity of the mix tank 26 can be dispensed with by blending methanol line 28 with the concentrated formaldehyde solution from line 24 and introducing both directly into line 36.

EXAMPLE

Gaseous effluent from a formaldehyde converter, in which a rich methanol-air mixture was catalyzed by silver, was divided into two streams: one stream going to the conventional aqueous formaldehyde plant while the second stream was introduced to the methanol formaldehyde facility. The gaseous effluent stream had the following composition:

| | |
|---|---|
| 24.7 | formaldehyde |
| 11.9 | water |
| 19.4 | methanol |
| 44.0 | inerts such as nitrogen, hydrogen, carbon dioxide, etc. |

The pressure at the exit of the converter was substantially atmospheric and the temperature of the gaseous effluent was 125°C. Of the total gaseous effluent produced in the converter, 1,205 c.f.m., measured at STP, were introduced into the water absorber and 395 c.f.m. were introduced into the concentrator-absorber. The vapors introduced into concentrator-absorber were scrubbed with aqueous formaldehyde solution from the water absorbed, which was introduced into the upper portion of concentrator-absorber through line 66 at the rate of 1 g.p.m., and recirculating solution 18. The aqueous formaldehyde solution was at the temperature of 60°C. and had the following composition:

47% formaldehyde
23% methanol
30% water

The temperature and pressure at the top of the concentrator-absorber was 80° C. and 15 p.s.i.a., while at the bottom thereof, it was 90° C. and 16.0 p.s.i.a. The unabsorbed vapors from the concentrator-absorber were passed through line 16 and into line 60 at a rate of 375 c.f.m. These vapors were at substantially atmospheric pressure and at a temperature of 78° C. The composition of the vapors was as follows:

19.0% $CH_2O$
23.3% $CH_3OH$
16.2% $H_2O$
41.5% Inert

A stream of concentrated formaldehyde solution was withdrawn from the concentrator-absorber at a rate of 50 g.p.m. This stream was at a temperature of 85° C. and had the following composition:

72% formaldehyde
17% methanol
11% water

One g.p.m. of this stream was withdrawn from line 18 and introduced into mix tank where it was mixed with a sufficient amount of methanol to provide a methanol-formaldehyde of the following composition:

55% formaldehyde
34% methanol
11% water

The main objective of the process described above is to remove water from the aqueous formaldehyde solution introduced into the concentrator-absorber and thus concentrate the solution with respect to formaldehyde. This objective is achieved by maintaining the temperature of the liquid at the bottom of the concentrator-absorber preferably below 100° C. to drive off water. Although water is driven off, most of the methanol remains in solution. This outcome is unexpected in view of the respective boiling points of methanol and water, i.e., 65° v. 100° C.

There are two principal advantages of the herein-described process over analogous prior art processes:
1. economics, and
2. absence of paraformaldehyde formation.

My process is more economical than the known processes for producing methanol-formaldehyde solutions because it is simpler and requires less equipment. In the past, methanol-formaldehyde solutions were prepared by distilling primary solutions containing formaldehyde, methanol and water to obtain concentrated formaldehyde solutions of about 85 percent formaldehyde and 15 percent water which concentrated solutions were then blended with enough methanol to result in the desired methanol-formaldehyde composition. Since the boiling point of methanol is 65° C. and since the water content of the primary solutions was too high, distillation was resorted to remove excess water. In the process of distilling the water off, methanol was completely removed because its boiling point is lower than that for water. The hereindescribed process avoids the necessity for a still and avoids the distillation procedures. In accordance with my process, a methanol-formaldehyde solution is prepared by scrubbing a portion of the gaseous effluent from a formaldehyde converter with an aqueous formaldehyde solution obtained from a conventional formaldehyde plant to obtain a concentrated aqueous formaldehyde solution which is subsequently blended with a predetermined amount of methanol.

Formation of the paraformaldehyde precipitate is avoided in the case of my formaldehyde solutions since they are stable at temperatures down to about 70° C. This is not the case with the concentrated formaldehyde solutions of the past. Solutions prepared by conventional procedures are not stable below 100° C. and will polymerize if maintained even about 100° C. for an extended duration. The fact that my solutions are stable at lower temperatures also has the inherent benefit of inhibiting formation of formic acid.

I claim:

1. In a process for producing aqueous formaldehyde solution comprising
    passing a gaseous effluent from a formaldehyde converter using a silver catalyst, to a water absorber;
    introducing an aqueous solution into the water absorber countercurrently to said gaseous effluent for the purpose of scrubbing said gaseous effluent of its water-soluble constituents;
    withdrawing a liquid stream from the lower portion of the water absorber;
    recirculating at least a portion of said liquid stream to the upper portion of the water absorber; the improvement being a process for producing a methanol-formaldehyde solution which comprises
    introducing a portion of said gaseous effluent into a concentrator-absorber;
    introducing a portion of said liquid stream into the concentrator-absorber wherein said gaseous effluent is scrubbed with said liquid stream;
    withdrawing a concentrated formaldehyde solution from the lower portion of the concentrator-absorber;
    recirculating at least a portion of said concentrated formaldehyde solution to the upper portion of the concentrator-absorber;
    withdrawing a portion of said concentrated formaldehyde solution; and
    mixing the portion of said concentrated formaldehyde solution with sufficient amount of methanol to obtain a methanol-formaldehyde solution of the desired composition.

2. Process of claim 1 wherein the temperature and pressure at the top of the concentrator-absorber is 75° to 125° C. and 10 to 20 p.s.i.a., respectively, while at the bottom, the respective values are 85° to 125° C. and 11 to 21 p.s.i.a.

3. Process of claim 2 wherein the composition of said gaseous effluent is 10–35 percent formaldehyde, 5–20 percent methanol, 5–25 percent water and 40–75 percent inerts, the temperature of said gaseous effluent at the exit of the formaldehyde converter is in the range of 450° to 650° C.

4. Process of claim 3 wherein pressure of said gaseous effluent at the exit of the formaldehyde converter is 10–20 p.s.i.a.

5. Process of claim 1 wherein proportion of said liquid stream from the water absorber introduced into the concentrator-absorber to the concentrated formaldehyde solution recirculated to the concentrator-absorber is in the range of 1:20 to 1:100.

6. Process of claim 1 wherein said mixing of methanol with said concentrated formaldehyde solution is carried out in-line.

7. Process of claim 1 including the steps of venting unabsorbed vapors from the water absorber;
    withdrawing unabsorbed vapors from the concentrator-absorber; and
    introducing unabsorbed vapors from the concentrator-absorber into the lower portion of the water absorber.

8. Process of claim 7 including the steps of
    combining the gaseous effluent going to the water absorber with the unabsorbed vapors from the concentrator-absorber; and
    introducing this mixture into the water absorber.

9. Process for producing methanol formaldehyde solution comprising
    introducing gaseous effluent from a silver catalyst-formaldehyde converter to a concentrator-absorber;
    introducing an aqueous formaldehyde solution into the concentrator wherein said gaseous effluent is scrubbed with said aqueous formaldehyde solution;
    withdrawing unabsorbed vapors from the concentrator-absorber;
    withdrawing a concentrated formaldehyde solution from the concentrator-absorber;
    recirculating said concentrated formaldehyde solution to the concentrator-absorber;
    withdrawing a portion of said concentrated formaldehyde solution; and
    mixing methanol with the portion of said concentrated formaldehyde solution to obtain a methanol-formaldehyde solution of the desired composition.

10. Process of claim 9 wherein the temperature and pressure at the top of the concentrator-absorber is 75° to 125° C. and 10 to 20 p.s.i.a. respectively, while at the bottom, the respective values are 85° to 125° C. and 11 to 21 p.s.i.a.

11. Process of claim 10 wherein the composition of said gaseous effluent is 10–35 percent formaldehyde, 5–20 percent methanol, 5–25 percent water and 40–75 percent inerts; the temperature of said gaseous effluent at the exit of the formaldehyde converter is in the range of 450° to 650° C.

12. Process of claim 11 wherein proportion of said aqueous formaldehyde solution to said concentrated formaldehyde solution to said concentrated formaldehyde solution that is recirculated into the concentrator-absorber is in the range of from 1:30 to 1:50, and wherein the proportion of said concentrated formaldehyde solution that is returned to the concentrator-absorber to the portion of said concentrated formaldehyde solution withdrawn from said recirculating solution is in the range of from 30:1 to 50:1, the proportions being on weight basis.

13. In the process of claim 12, wherein the temperature of said aqueous formaldehyde solution is in the range of 40° to 125° C. and the temperature of said concentrated formaldehyde solution at the exit from the concentrator-absorber is from 85° to 125° C., the process further including the step of withdrawing the unabsorbed vapors from the concentrator-absorber.

14. Process of claim 13 wherein composition of said concentrated formaldehyde solution is as follows:

60–75% $CH_2O$
15–25% $CH_3OH$
5–16% $H_2O$

* * * * *